Sept. 22, 1936.     P. E. EDELMAN     2,055,216
ELECTRICAL CONDENSER AND ITS MANUFACTURE
Filed Aug. 30, 1929     7 Sheets-Sheet 1
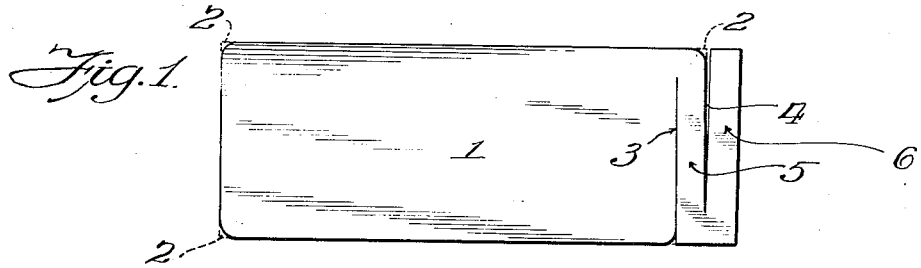
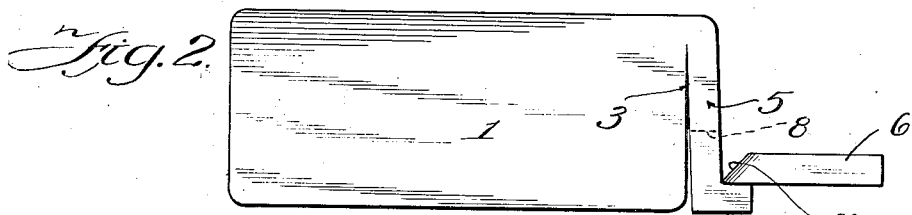
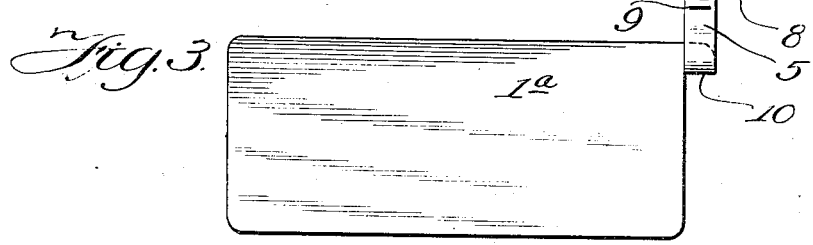
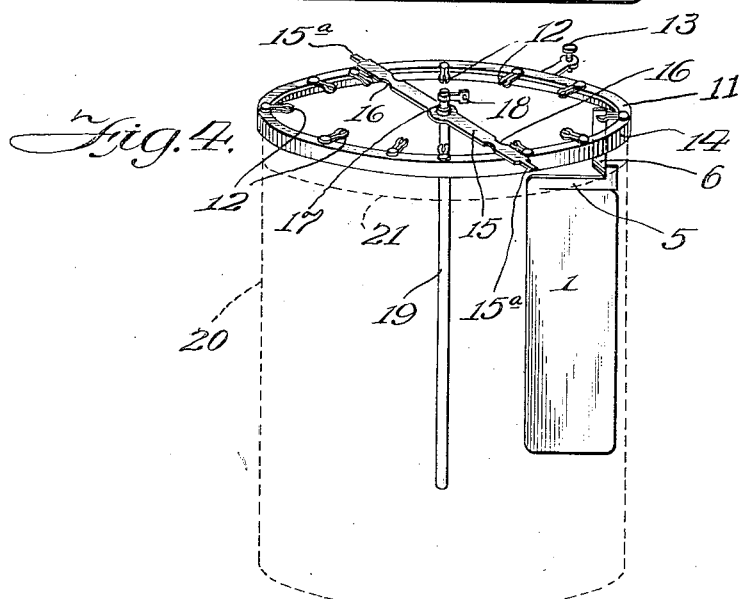

Sept. 22, 1936.                P. E. EDELMAN                2,055,216
                ELECTRICAL CONDENSER AND ITS MANUFACTURE
                    Filed Aug. 30, 1929        7 Sheets-Sheet 2
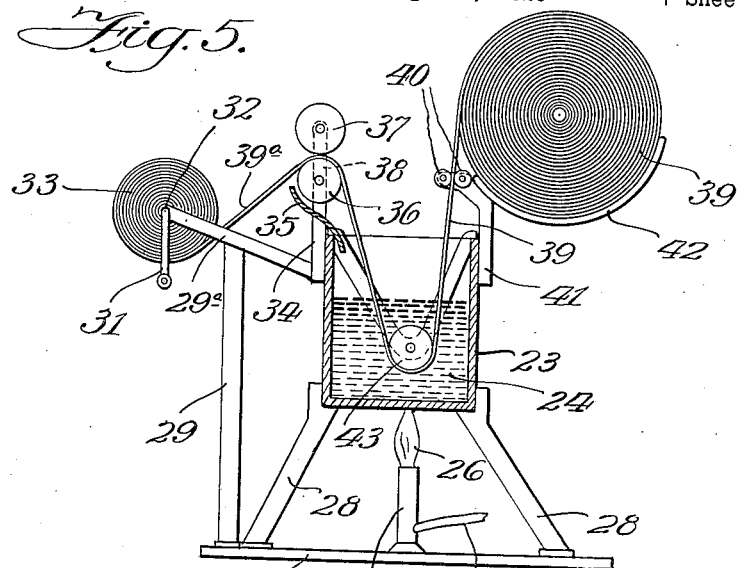
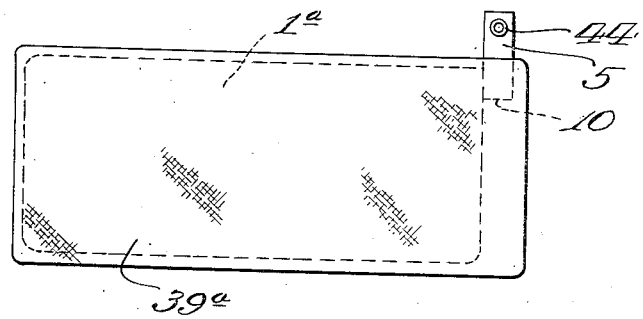
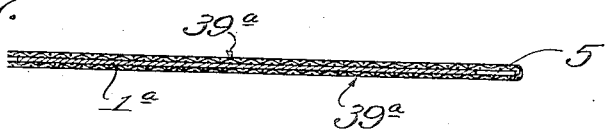
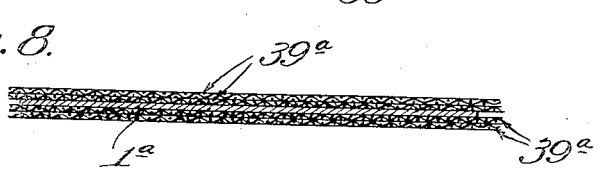
Inventor
Philip E. Edelman.
By Banning + Banning
Attys.

Sept. 22, 1936.   P. E. EDELMAN   2,055,216
ELECTRICAL CONDENSER AND ITS MANUFACTURE
Filed Aug. 30, 1929   7 Sheets-Sheet 3
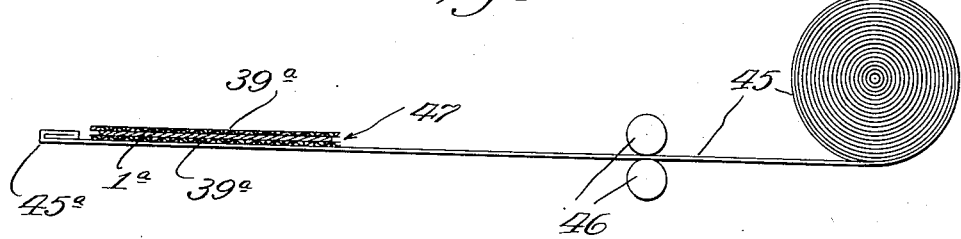
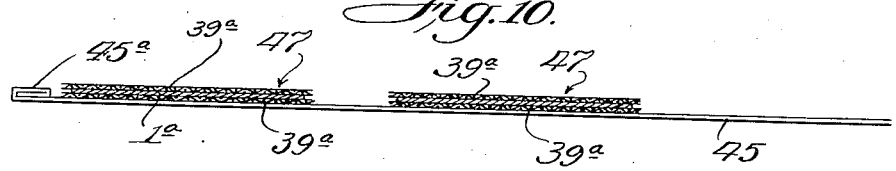
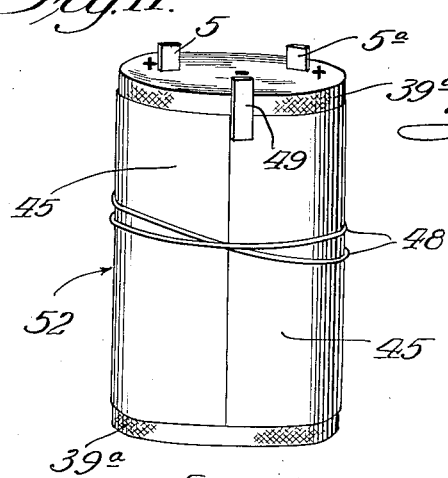
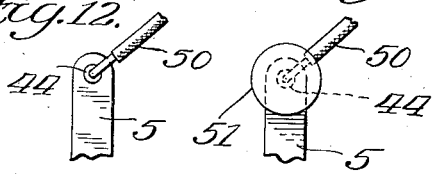
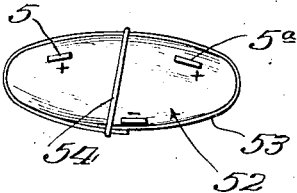
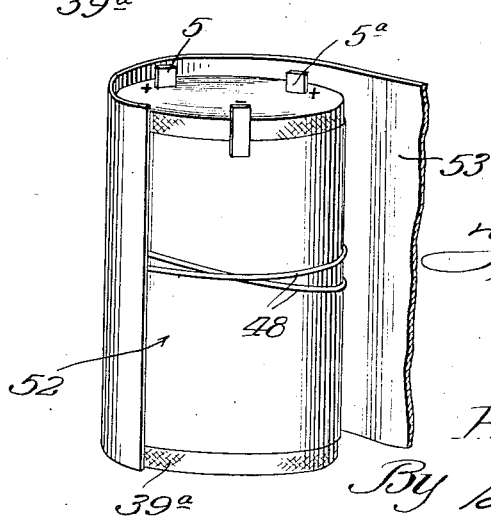
Inventor
Philip E. Edelman.

Sept. 22, 1936. P. E. EDELMAN 2,055,216
ELECTRICAL CONDENSER AND ITS MANUFACTURE
Filed Aug. 30, 1929 7 Sheets-Sheet 4
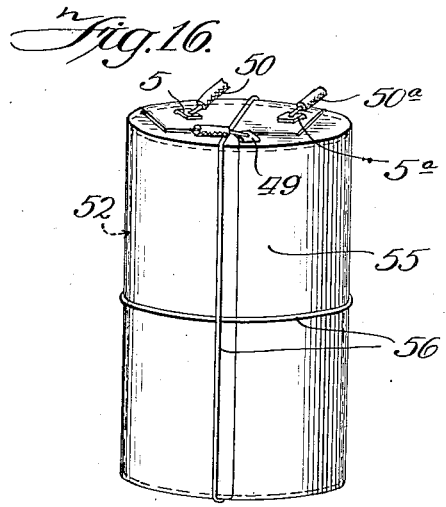
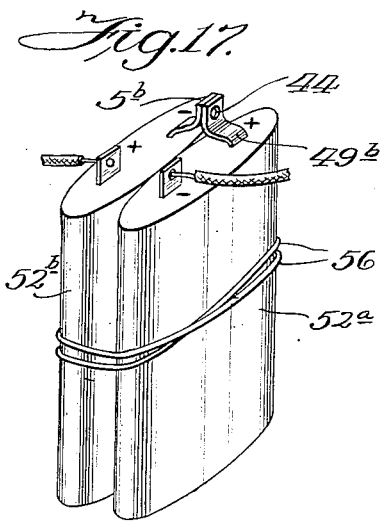
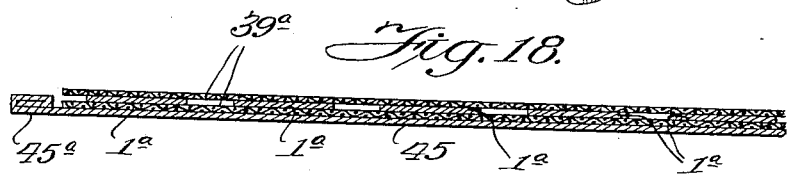
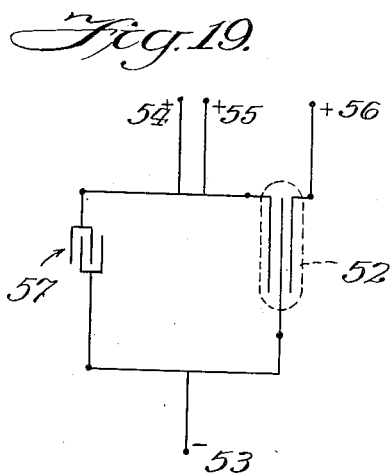
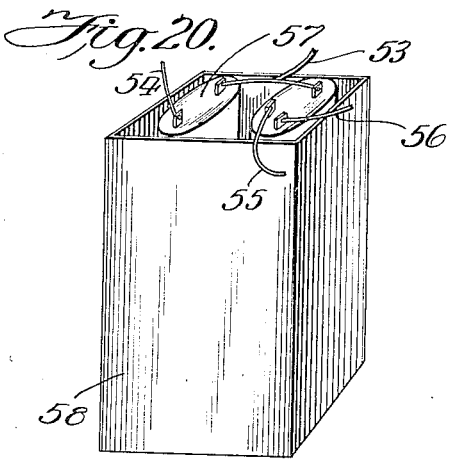
Inventor
Philip E. Edelman,
By Banning & Banning
Attys.

Sept. 22, 1936.                P. E. EDELMAN                 2,055,216
              ELECTRICAL CONDENSER AND ITS MANUFACTURE
                     Filed Aug. 30, 1929          7 Sheets-Sheet 5
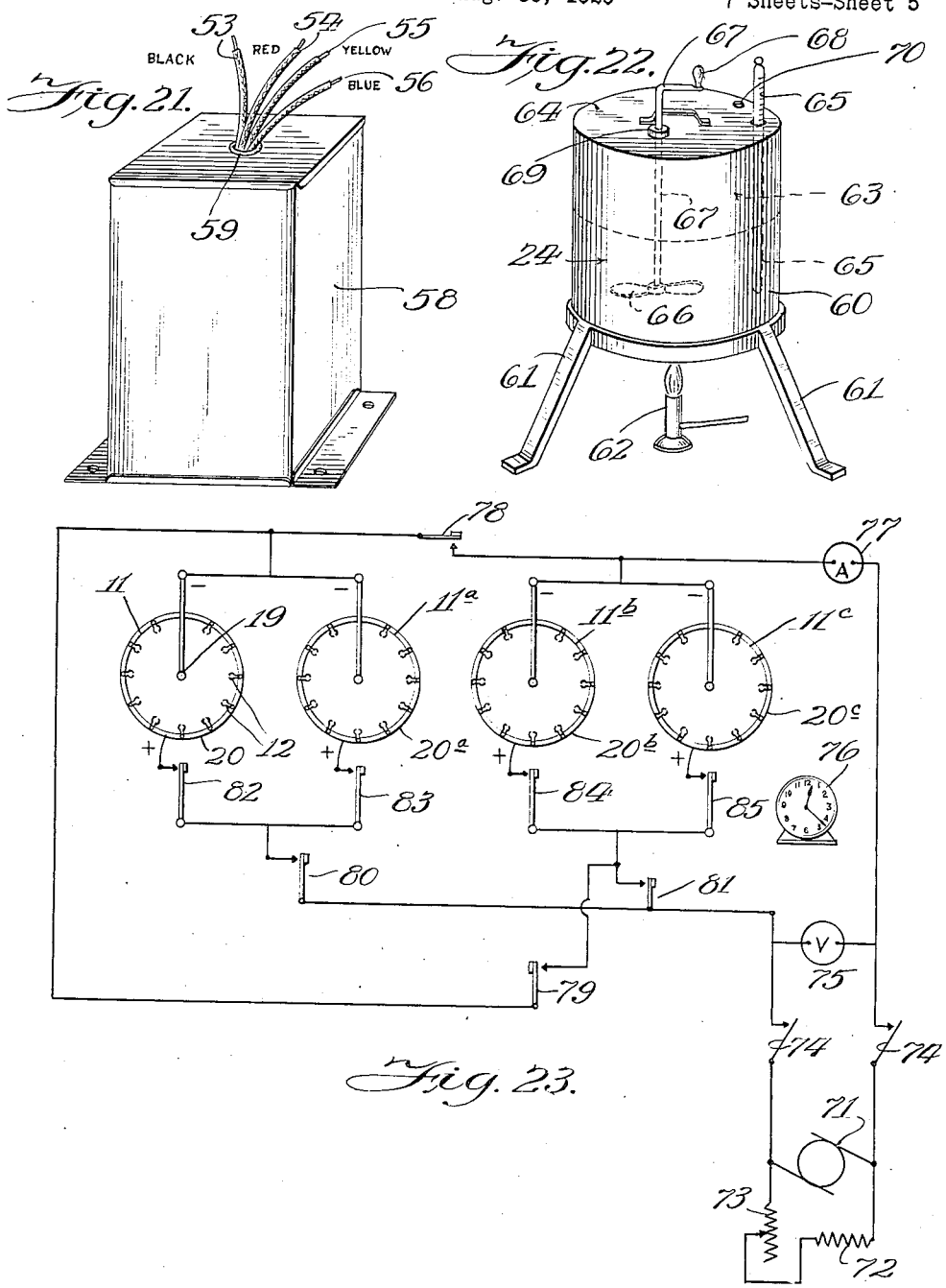

Sept. 22, 1936.  P. E. EDELMAN  2,055,216
ELECTRICAL CONDENSER AND ITS MANUFACTURE
Filed Aug. 30, 1929   7 Sheets-Sheet 6

Inventor
Philip E. Edelman.
By Banning & Banning
Attys.

Sept. 22, 1936.　　　P. E. EDELMAN　　　2,055,216
ELECTRICAL CONDENSER AND ITS MANUFACTURE
Filed Aug. 30, 1929　　　7 Sheets-Sheet 7

Inventor
Philip E. Edelman.
By Banning + Banning
Attys.

Patented Sept. 22, 1936

2,055,216

UNITED STATES PATENT OFFICE 2,055,216

ELECTRICAL CONDENSER AND ITS MANUFACTURE

Philip E. Edelman, Chicago, Ill., assignor, by mesne assignments, to Robert T. Mack, trustee, Chicago, Ill.

Application August 30, 1929, Serial No. 389,388

14 Claims. (Cl. 175—315)

This invention relates to electrical condensers and their manufacture, and more particularly to electro-chemically prepared, hermetically sealed high voltage type condensers.

Heretofore, there has been difficulty in standardizing and producing uniform condensers able to withstand high operating voltages on continuous service. Paper condensers have been found both expensive and unable to withstand operating surge currents which commonly occur in circuits capable of alternating current resonance conditions. Wet electrolytic condensers have the fault of watering troubles, occurrence of short circuiting precipitates during use, loss of film on standing idle, and non-uniformity, as well as the undesirable large bulk of electrolyte required therefor.

An object of this invention is to provide a high grade inexpensive high voltage type condenser which can be uniformly produced in quantity. A further object is to provide a condenser of self healing type when subjected to abnormal surge voltages. A further object is to provide a hermetically sealed condenser having the characteristics of long operating life, immunity to decay on standing idle during shipment or non-use, absence of watering troubles, ability to withstand extremes of temperature in shipment and in service, and small bulk and weight.

These and other objects, as will presently appear, are accomplished by this invention which is fully described in the following specification and shown in the accompanying drawings, in which—

Figure 1 is a plan view of a blank positive filming metal electrode prepared according to my invention;

Fig. 2 is a plan view of a partly developed form of the blank of Fig. 1;

Fig. 3 is a plan view of a filmed electrode prepared from a blank as shown in Fig. 2;

Fig. 4 is a perspective view of a processing rack showing the operating position of an electrode blank such as shown in Fig. 2, in which the processing electrolyte container is shown in dotted lines because the rack shown in Fig. 4 is also used for a drying rack in the manufacture of the processed electrode plates such as shown in Fig. 3;

Fig. 5 is a partly sectioned vertical elevation view showing a suitable means for impregnating with the operating electrolyte mass used in the completed condenser according to my invention;

Fig. 6 is a plan view showing one processed electrode plate covered by an impregnated fabric according to my invention;

Fig. 7 is a sectioned diagram of the essential relation of the parts of Fig. 6;

Fig. 8 is a schematic diagram showing the preferred structure according to Fig. 6;

Fig. 9 is a diagram showing the assembly of a covered electrode plate as shown in Fig. 6 combined with a co-operating negative electrode;

Fig. 10 is a schematic diagram explanatory of the assembly according to Fig. 9;

Fig. 11 is a perspective view of a completed condenser roll containing two processed electrode plates and one co-operating negative metal strip prepared as aforesaid and shown in the preceding figures;

Fig. 12 is a front elevation of a part of an electrode terminal showing the manner of attaching a terminal wire thereto;

Fig. 13 is a view similar to that of Fig. 12 with the addition of the protective coating 51 applied to the finished terminal connection;

Fig. 14 is a perspective view showing the manner of applying the absorbent wrapper 53 applied to the processed condenser winding of Fig. 11;

Fig. 15 is a plan view showing the completed assembly according to Fig. 14;

Fig. 16 is a perspective view showing the condenser wrapped ready for assembly in a container;

Fig. 17 is a view similar to Fig. 16 in the case where two condenser rolls are assembled in series connection;

Fig. 18 is a diagrammatic representation of the essential relation of the electrodes and spacer elements used according to my invention;

Fig. 19 is a circuit diagram of a completed condenser block wired according to my invention;

Fig. 20 is a perspective view of a partly assembled condenser unit, according to Fig. 19, placed in a protective container;

Fig. 21 is a perspective view of the finished assembly in the container according to Fig. 20;

Fig. 22 is a diagram of a suitable means for preparing the mixture used for impregnating the spacer strips according to Fig. 5;

Fig. 23 is a diagram of the processing arrangement used to coat a di-electric layer of permanent characteristics on the processed electrodes prepared from blank sheet metal according to Fig. 1;

Figure 24:
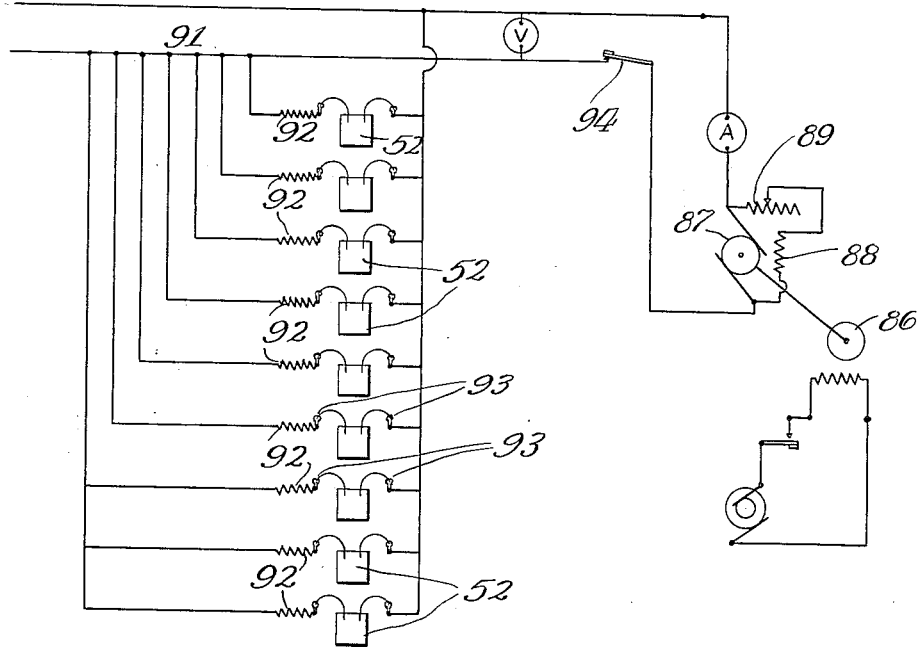
Fig. 24 is a diagram of the preferred form of ageing means employed according to my invention to place the assembled condenser rolls in operative condition.

Owing to the elaborate nature of my invention in the mode of manufacturing the product, a single drawing would not adequately illustrate same, and I am showing same, step by step, in a series of co-operating and related drawings to make the invention clear to anyone skilled in this art. I am illustrating a preferred structure as an exemplification of my invention which has been proven to accomplish the objects stated.

(I) *Raw filming metal*

For raw material useful in preparing the sheet metal blank according to Fig. 1 I may use any suitable filming metal, such as aluminum or an alloy thereof, or tantalum, but I prefer to employ first grade soft aluminum of commerce rolled into sheet form of thickness of the order of .006", free from oil or grease. The width of the sheet aluminum may be selected at any convenient value, such for example as 3 inches and the length of the blank 1 shown in Fig. 1 may similarly be predetermined according to the capacity desired in the finished condenser product. I prefer to arbitrarily establish a desired capacity per unit plate blank, such as shown in Fig. 1 at some value, such for example as ¼ mfd. per square inch area thereof, and to appropriately proportion the processing of said blank to attain and control such selected value as selected within close limits. This is more convenient than any attempt to govern fractional dimensions of the blank 1 of Fig. 1 to attain desired capacity value thereof in the finished condenser, and lends uniformity to the processing, in, that the treating voltage used, can be readily proportioned to attain the desired capacity value in a given area of the blank 1.

Referring now, more particularly to Fig. 1, the filming metal aforesaid, 1 has rounded or smoothed corners cut at 2, 2, 2, 2; also a slit 3 and a slit 4 sheared therein to form connector pieces 5, 4, respectively continuous with the electrode blank 1. This blank 1 is to be kept clean and smooth.

Fig. 2 shows how connector strip portion is bent over and folded flat at 7 to form a right angled extension piece 4 from connector portion 5. As shown in Fig. 3, the strip portion, 4, of Fig. 2, is finally cut off at the position shown by line 8 for reference purposes only, leaving connector portion 5 folded up from the processed electrode 1ª at fold 10. A colored line 9 is applied to tab terminal 5 with some insulating pigment, such as colored lacquer to indicate the capacity value of the processed plate 1ª of Fig. 3. The subscript "a" used in Fig. 3 to designate the processed plate 1ª indicates for reference purposes only, that said electrode plate has been coated with a permanized di-electric coating according to the herein described processing.

(II) *Processing of blank electrodes*

The processing of blanks prepared according to Fig. 2 is conveniently carried out by means of a rack 11 shown in Fig. 4. Rack 11 has a plurality of connector clips 12, by means of which blanks 1, of which one example is shown in operative position in the figure, are secured in alignment with respect to processing negative electrode 19, and also by means of which blanks, such as 1, may be withdrawn from treating container 20, shown by dotted lines, for explanatory purposes only, and dried, without necessitating handling of the treated blanks 1 by an operator's hands.

Processing electrode 19 is preferably a round ½ inch diameter Duriron rod, about 12 inches long, and secured by a collar 17 to a Bakelite support strip 15. A terminal 18 is provided on collar 17. The Duriron rod 19 is thereby adapted to be removed from the Bakelite support 15 while rack 11 is used for drying one batch of processed plates, such as 1. A plurality of similar racks 11, as shown in Fig. 4, is required for continuous manufacture of the said condenser plate 1. The Bakelite support 15 has indented portions 16, 16 formed thereon to mitigate current leakage caused by condensation of conducting vapor on strip 15 during operation of rack 11 in the processing as hereinafter set forth. Strip 15 is supported suitably from rack 11 so that rod 19 hangs substantially centrally with respect to connector clips 12, 12 etc. Rack 11 is preferably made from tinned brass and has an extension rim 14 adapted to fit over treating container 20 at the top thereof. A connector terminal 13 is provided on rack 11. The treating solution used in Fig. 4 is placed in the container 20 indicated by dotted lines to within ½ inch of the top thereof as indicated by dotted line 21 and maintained replenished to substantially this level. A suitable material for the container, shown by dotted lines, 20, is glazed stoneware. A characteristic blue deposit appears on the processed blank portion 4, corresponding to the junction between liquid level 21 and the atmosphere. The clips 12, 12, 12 etc., must be spaced so that adjacent blanks 1 held thereby do not touch each other and do not touch electrode rod 19 and do not touch any portion of the container indicated by dotted lines 20. A distance of at least 1 inch is preferably left between rod 19 and each filming metal blank such as 1, shown in Fig. 4. The extensions 15ª, 15ª of Bakelite support 15, may be used to hang up rack 11 during drying of plates, such as 1 after treatment in container 20.

(III) *Impregnation of fibrous spacer sheets*

Impregnation of the spacer fabric used according to my invention will next be described with reference to Fig. 5. In general, a gauze fabric strip 39, about ⅝ of an inch wider than the blank of Fig. 1, is uniformly impregnated with an operating chemical 24 to form an electrode spacer material 39ª. Gauze 39 may be similar to best grade clean and close textured cheese cloth, such as is used for surgical dressings, cut to the aforesaid predetermined width and in lengths of about 350 feet or less. Any suitable equivalent material may be substituted for fabric 39, the essential characteristics being specified as, uniform weave of textile or fibrous material characterized by a multiplicity of closely spaced pores in the strip 39. Gauze 39 is passed between guide rollers 40. The rollers 40 are journaled suitably in a support 41 carried by an impregnating container 23. A roller 43 is placed in operative position, as indicated in Fig. 5, in container 23, so that gauze 39 becomes impregnated with chemical mixture 24 as it is drawn therethrough. Squeeze or wringer rollers 36, 37 journaled suitably in and supported by a support 34 carried by container 23, remove excess chemical 24 collected by gauze 39. A drain return 35 returns the excess chemical 24 to container 23. A drum or reel 33 collects the impregnated gauze 39ª, as member 33 is rotated by means of crank 31 mechanically connected thereto in any suitable manner. Suitable supports 29, 29ª are provided for placing drum 33 in operative position aligned with respect to rollers 36, 37, and drive shaft 32, actuated by means of crank 31, is journaled suitably in member 29ª. A base 30 supports member 29, heater 25, and container leg supports 28, 28. A Bunsen burner 25, or any equivalent source of heat, is used to heat the chemical mixture 24 in container 23. Thus, for example, a gas line 27 may feed burner 25 so that flame 26 warms container 23 to about 95° C., to maintain mixture 24 at a predetermined fluidity during the impregnation of gauze 39. Container 23 must preferably be fabricated from cast aluminum to avoid contamination of the chemical mixture 24. The impregnated gauze 39ª may be used as hereinafter set forth. It will be evident that a uniform coating and impregnation of gauze 39 is had in the manner set forth, whereby chemical mixture 24 impregnates the fibres of fabric 39, as well as fills the pore spaces therein. The treated gauze 39ª will have a light orange to tannish coloring caused by the chemical mixture 24 employed according to this disclosure.

(IV) *Covering plates with treated gauze*

The covering of processed plates 1ª with impregnated gauze will now be described with reference to Fig. 6. The processed and dried filmed electrode plate 1ª is sandwiched in between the impregnated gauze 39ª so that the latter overlaps plate 1ª and covers same, except at tab extension strip 5 thereof. Double layers of gauze 39ª may be used to insure good coverage of plate 1ª. A connector eyelet 44 may be attached to tab 5 at this time or later. The relation of plate 1ª to gauze 39ª is shown in Fig. 7. Fig. 8 shows this relation when double layers of gauze 39ª are used. It may be here remarked that whereas chemical 24 is heated to obtain impregnation of gauze 39 as described for Fig. 5, the impregnated gauze 39ª is preferably first cooled and applied to cover plate 1ª when at room temperature. Chemical 24 is thus congealed in gauze 39 before same is used in the assembly, as in Fig. 6.

(V) *The condenser winding*

The preparation of the condenser winding will now be described with reference to Fig. 9. In the case of polarized condensers for use on filter circuit service, the co-operating negative electrode for use with a positive electrode 1ª covered by impregnated gauze 39ª may be ordinary first grade soft aluminum sheet metal substantially .006″ thick and either the same width as the width of plate 1ª or else slightly wider. The sheet 45 may be of any other suitable metal besides aluminum. Metal 45 is smoothed between rollers 46 and started as a winding as end 45ª thereof. An assembly 47, such as in Fig. 6, consisting of a positive plate 1ª coated with gauze covering 39ª previously impregnated with chemical, as in Fig. 5, is inserted on sheet 45 as shown in Fig. 9 and the winding continued from end 45ª so as to roll up element 47 interleaved with sheet 45. The winding of sheet 45 is continued after element 47 is rolled up so that metal 45 extends beyond and over the element 47. Then a second element like 47, or of different length may be wound up, and so on for any desired number of elements 47 to be assembled in one roll. A completed roll 52, so made with two elements, such as 47 as diagrammed in Fig. 10, is shown in Fig. 11. The negative sheet 45 is overlapped around the roll 52 and has a tab terminal 49 brought up therefrom, while tab terminals 5 and 5ª from two elements, such as 47, Fig. 10, are brought up in usual manner. A rubber band 48 holds the roll 52 in place for subsequent handling. The chemical in gauze 39ª is held congealed therein at room temperature and does not run out.

While assembly numbered 52 in Fig. 11 is called a roll or condenser winding, it may be substantially flat or any other desired shape according to the manner in which the end 45ª of metal 45 in Fig. 9 is started for the winding.

The preferred manner of attaching a connector wire, such as 50, see Fig. 12, to tab strip 5, is to affix a tinned tubular eyelet 44 thereto and to solder wire 50 to said eyelet 44. Then, if desired, a coating of pitch or rubber 51 may be applied, as shown in Fig. 13, to protect the junction of wire 50 and eyelet 44. Coating 51 may be deferred until roll 52 is further processed and assembled in a container, if desired, without detriment to the operation of the assembly numbered 52.

(VI) *Wrapping the condenser*

As shown in Figs. 14 and 15, the assembly numbered 52, as in Fig. 11, is now wrapped with a layer of absorbent sheet fibrous material, such as blotter paper 53. Blotter paper 53 is held in place by a string or rubber band 54, Fig. 15. The function of blotter paper 53 is to protect roll assembly 52 when same is subjected to the thermic action of the sealing wax later used to fasten same in a container as will presently appear, and further to absorb any excess chemical from impregnated gauze 39ª which may appear at the rim margins of gauze 39ª.

The next step, continuing the example described, is to wrap a varnished insulating paper 55 around assembly 52, as shown in Fig. 16, to substantially form a package wrapper 55 thereabout. Rubber bands or string 56 may be used to hold wrapper 55 in place. Terminals, 5, 5ª and 49 are bent down over the top portion of wrapper paper 55, as shown in Fig. 16.

In the case of series assembly, a pair of condenser rolls 52, 52ª respectively will be assembled as in Fig. 17, placed so that a positive tab 5ᵇ of roll 52ᵇ is adjacent to a negative tab connector 49ᵇ of roll 52ª. Then an eyelet 44 is driven through 5ᵇ and 49ᵇ to electrically join roll condenser 52ᵇ in series with roll condenser 52ª. The series connected rolls 52ᵇ and 52ª may then be wrapped as in the example shown in Fig. 16.

A roll such as 52 may have one or more positive plates, such as 1ª, and a suitable manner of assembling five such plates for example, is shown in Fig. 18. A plurality of separated prepared plates 1ª, 1ª, etc., some of which may be of different lengths than others thereof, are placed between impregnated gauze strips 39ª and adjacent to a co-operating common negative aluminum strip 45, so that the whole may be rolled up as an integral condenser winding in the aforesaid manner.

(VII) *Circuit connection assemblies*

Circuit connections and assemblies suitable for use with my invention are shown only by way of example. Thus, in Fig. 19, a negative terminal 53 and three separated positive terminals 54, 55, 56 may be provided for a condenser block, in which one roll assembly 52 is combined with another separate condenser 57. Such an arrangement is shown in Fig. 20, in which the condenser 57 and the roll condenser assembly 52 are mounted in a container 58. The container 58 may be filled with paraffin or other kind of wax and completed as shown in Fig. 21. Wires 53, 54, 55, 56 may be appropriately colored to distinguish same according to the connections of Fig. 19, and are brought out from container 58 through a rubber grommet 59 attached to the cover of can 58.

(VIII) *Preparation of the operating chemical*

The preparation of chemical 24, used as aforesaid, is illustrated in Fig. 22. The mixture 24 is placed in an aluminum cooking vessel 60 supported by members 61, 61, so that a heater 62 can warm mixture 24 in the vessel 60. Container 60 has a cover 64 arranged so that a thermometer 65 may be inserted into mixture 24. An air space 63 must be left above the level of mixture 24, as same expands considerably during the cooking operation. Cover 64 has a stir shaft 67 journaled therein at 69. A crank 68 operates shaft 67 to which a small propeller element 66 is attached, in order that mixture 24 may be agitated and stirred during the cooking thereof. A vent hole 70 is provided in cover 64.

The chemical mixture 24 consists preferably of pure powdered gum arabic dissolved in hot glycerine, in about the following proportions:

| | Pounds |
|---|---|
| C. P. glycerine | 40 |
| XXX grade best powdered gum arabic, clear white | 10 |

More or less gum arabic may also be used if desired, but the stated proportion is found to be very suitable for the purpose.

The preferred manner of cooking the mixture 24 is to first warm the glycerine content thereof to about 100° C., whereupon the powdered gum arabic previously weighed out in correct amount is added and stirred in vessel 60. As a precaution, a large air space 63 is allowed in vessel 60 because glycerine is inflammable at high temperature if permitted to spill over the top of vessel 60 to reach heater 62.

The cooking with occasional agitation continues for a period of about 30 minutes with the heat from heater 62 proportioned so that by the end of this time the thermometer 65 will show a reading between 140° C. and 150° C. The temperature should never be raised much higher than 140° C., as the mixture 24 begins to expand its volume rapidly at about such limiting temperature during the cooking thereof. The completed batch of chemical 24 will now have a light tannish to orange color and immediately after cooking will be in thin hot liquid form which should be poured through a cheese cloth filter into a storage container and kept closed from the atmosphere. It congeals on cooling to a thick syrup or semi-gummy mass of relatively slight fluidity and must be re-warmed to again bring said mass to fluidity, as set forth in the description of Fig. 5, but never boiled or burned. For restoring fluidity for impregnation purpose, it is only necessary to gently re-warm the chemical mixture 24 to about 90° C. to bring it into liquid state of sufficient fluidity for such use. The mixture 24 is entirely stable and can be used at any time after its preparation. It does not attack aluminum. The aforesaid mixture 24 affords an excellent high voltage operating electrolyte material for use with the prepared plates, such as 1ª, so that condensers, such as 52 can be continuously operated on high voltage service with minimum leakage and energy loss. The chemical mixture 24 selected in the stated proportion also has the desirable property of preserving the di-electric coating on plate 1ª, and the further desirable characteristic of re-coating or re-filming same in the event that a surge causes transient rupture of said di-electric film.

(IX) *Coating di-electric film on electrode plates*

The preferred manner of preparing the di-electric coating on plates 1 will now be set forth with reference to Fig. 23.

A shunt generator 71 with a no-load voltage of 750 volts has a field winding 72 and controlling resistance rheostat 73 connected to switches 74, 74. A voltmeter 75 and an ammeter 77 indicate the current and voltage used. A clock 76 shows the time elapsed for the treatment processing. A plurality of treating containers, such as 20, 20ª, 20ᵇ, 20ᶜ are arranged with treating racks, 11, 11ª, 11ᵇ, 11ᶜ, as in Fig. 4. Blank filming metal sheets, 1, as in Fig. 2 are placed in position as in Fig. 4, a few such blanks 1, 1, being added to rack 11 at a time, in order not to overload generator 71. Additional plates 1, 1, are added at intervals of a few minutes apart as the current passed by previously treated plates diminishes and permits new plates to be added as aforesaid.

Switches 79, 80, 81, 82, 83, 84, 85, and 78 control the circuit connections for series and later for parallel operation of the two respective treating rack groups 11, 11ª and 11ᵇ, 11ᶜ. This mode of operation is employed to fully utilize the output of generator 71 to best advantage, because in the processing of a plate 1 the initial current required is large, but rapidly diminishes to a small value in a few minutes of time, as shown by clock 76 and meters 77 and 75.

To start with, two blank plates 1 may be placed in each treating container 20, 20ª, 20ᵇ, 20ᶜ, while the switches are manipulated so that racks 11 and 11ª are in parallel, racks 11ᵇ and 11ᶜ are in parallel, but the 11, 11ª are in series with respect to the groups 11ᵇ, 11ᶜ. This is accomplished by opening switch 78, closing switch 79, closing switches 82, 83, 84, 85 and 80, and opening switch 81. This series connection will be used until, the racks such as 11 are all filled with plates 1, 1 etc., in process. Switches 74, 74 must be open while new plates, such as 1 are added to racks, such as 11. The electrolyte used in containers such as 20 will presently be specified and is a clear solution so that plates 1 under treatment can be observed by an operator. After racks 11, 11ª, 11ᵇ, 11ᶜ are filled with plates being treated, the operation is for the time being terminated at the end of ten minutes elapsed as shown by clock 76, whereupon the switches are now manipulated to obtain parallel connection as follows. Switch 81 is closed, switch 78 is closed, and switch 79 is opened. The switches 74 are then closed to apply the full voltage from generator 71 to the parallel connected racks 11, 11ª, 11ᵇ, 11ᶜ. Rheostat 73 is appropriately regulated at the start of both series and parallel treating operations so as not to overload generator 71, thereby causing the initial voltage used therefrom to be lower and gradually increased to the maximum as the resistance of rheostat 73 is reduced to its minimum position or value. Thus, for the first parallel operation, the voltage shown by meter 75 may start as low as 250 volts and be increased in a short time up to 750 volts; while for parallel operation, as aforesaid, the voltage may start at 325 volts and terminate at 480 volts, as controlled by rheostat 73. The parallel operation is arbitrarily predetermined at a fixed interval of time, such as 40 minutes. During the operations aforesaid, the treating electrolyte in jars 20, 20ª, 20ᵇ 20ᶜ will be occasionally replenished as required with diluted treating solution or distilled water as may be necessary to maintain correct liquid levels. As set forth in conjunction with Fig. 4, the characteristic blue line marking 22 appears on plates 1, being processed, and serves as a guide for the operation.

Upon completion of the processing set forth, racks 11, 11ª, 11ᵇ, 11ᶜ, are removed from containers 20, 20ª, 20ᵇ, 20ᶜ and the processed plates, 1, 1, etc., held on racks aforesaid, are permitted to dry while held by said racks. Meanwhile duplicate racks may be placed in operating position on containers 20, 20ª, etc., and the operation repeated as aforesaid. The dried processed plates 1ª are then finished as shown and set forth for Fig. 3, and suitably marked by identification marker 9. They may be stored or used as desired and do not deteriorate on standing or storage in a clean container or in clean air.

(X) *The treating electrolyte*

The treating electrolyte preferred for use in containers 20, 20ª, etc., is a clear solution of distilled water containing both ammonium bitartrate and ammonium hepta-molybdate in about the following proportions:

Distilled water_____ 5 gallons
Ammonium bitartrate, C. P____ 1 to 1½ ounces
Ammonium hepta - molybdate,
  C. P. crystals_____ ½ to ¾ ounce For replenishing or make up solution to maintain liquid level in container 20, for example, the above mixture may be diluted by adding ten parts of distilled water to one part of the aforesaid solution. In preparing the solution the ammonium bitartrate is to be separately dissolved in a portion of the aforesaid distilled water and the ammonium hepta-molybdate is to be dissolved in the remainder of said distilled water, then the two aforesaid solutions are to be mixed and agitated to form a single electrolyte solution. I prefer to pour this solution through a tinned iron funnel into a glass container, as the contact of said funnel is observed to influence the solution favorably and most probably by catalytic contact action. The distilled water may be warmed for this purpose but should not be boiled. After prolonged use, the solution should be filtered to remove suspended matter introduced into tank 20 by surface impurities on the metal blank plates 1. No initial cleaning of the blank plates 1, 1 etc., is required as a thorough detergent action of the aforesaid electrolyte and the aforesaid electrical treatment, cleans impurities from the surface of raw plate blanks 1, 1, etc. Exhaustion of the treating electrolyte is shown by failure of the aforesaid characteristic blue line to appear on plates in process and can be remedied by renewal of the electrolyte chemicals or solution as required.

(XI) *Ageing of condensers before use*

Ageing of the completed condenser elements 52 shown in Fig. 16 is accomplished as shown in Fig. 24, and requires a period of about 5 minutes per condenser. A suitably driven generator 87 regulated by rheostat 89 to deliver about 500 volts D. C. feeds bus bars 90 and 91 to which a plurality of resistances 92, 92 etc. of about 10,000 ohms each are connected. Clips 93 are provided so that a condenser roll 52 can be placed in circuit with bus bars 90, 91 in series with resistance element 92. Current of correct polarity is then applied by closing switch 94 for a period of about 5 minutes and not longer than 12 minutes. This causes the gum content, of the mixture 24 used as aforesaid, to be driven into operative condition with respect to the electrodes of condenser element 52.

(XII) *Testing condensers*

Figure 25:
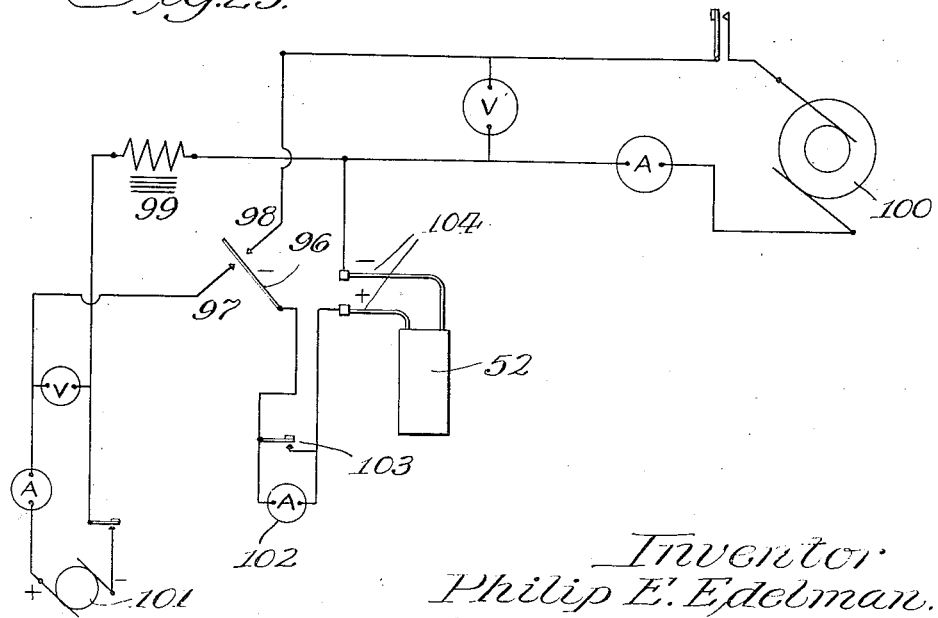
Fig. 25 is a circuit diagram of an arrangement for testing completed condensers according to my invention.

To test completed condenser elements 52, a circuit such as shown in Fig. 25, may be used. Clips 104 place condenser 52 in circuit under control of switch 96. When switch 96 contacts with contactor 97, with switch 104 closed to protect milli-ammeter 102, direct current source 101 is applied to condenser 52 at correct polarity through choke coil 99. After a brief time interval, switch 103 may be opened temporarily to obtain the milli-ampere reading of leakage current on meter 102. This leakage current will be negligibly small. Switch 103 is then closed and switch 96 is moved to contact with contactor 98, whereupon the alternating current source 100 is applied to condenser 52 and readings of voltage and current are observed. These readings may be co-related to the capacity of the condenser 52 in the usual manner. By the impedance method, the capacity in micro-farads is given by the equation, $$C = \frac{I}{2\pi fE}(10^6)$$

where E is the volts, I the amperes, and $f$, the frequency in cycles per second. Obviously this method is only correct for zero power factor condensers and must be co-related and corrected with reference to a standard test condenser substituted for test condenser 52.

As an example, a condenser unit 52 made with a single treated positive electrode plate 1ª as aforesaid, may have an area of 4 square inches and be treated according to Fig. 23 with the parallel operated voltage of generator 71, Fig. 23, adjusted to some value, such as 475 volts which will characterize plate 1ª with the equivalent of 1 mfd. of capacity in a finished condenser assembly 52. If test on a circuit, as shown in Fig. 25, shows too small a capacity reading, the treating voltage used in Fig. 23 may be slightly reduced during the parallel connection operation as aforesaid. Very uniform production of condensers, such as 52, can be attained in this manner.

(XIII) *Circuit arrangements*

Circuit arrangements for condensers or blocks employing one or more units, such as 52, are shown in Figs. 26, 27, 28, 29, and 30.

Figure 26:
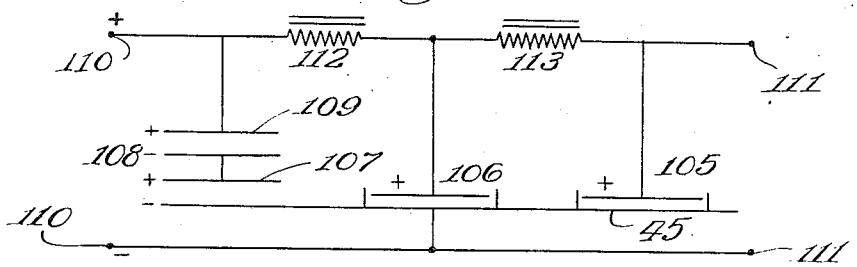
Fig. 26 is a diagram showing a use of my condenser.

In Fig. 26, the common negative electrode 45 of a roll condenser, such as 52 hereinbefore described has cooperating condenser elements 105 and 106 prepared as hereinbefore described, and one series section (107, 108, 109) as aforesaid in a filter arrangement 110 provided with cooperating choke coils 112 and 113 as well as output terminals 111. The conventional equivalent circuit corresponding to Fig. 26 is shown for comparison in Fig. 27. The series condenser assembly 24, 107, 108, 109 is necessary only at the input of filter circuit 110 at which point the alternating current component usually supplied to terminals 110 is large.

Figure 28:
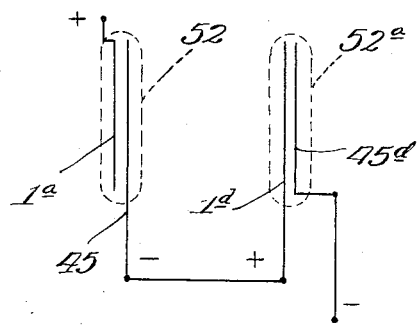
Fig. 28 is a diagram of a suitable circuit assembly of condenser rolls prepared as aforesaid.

In Fig. 28, two series connected condenser assemblies 52, and 52ª are shown. Unit 52 has a prepared positive plate 1ª in operative relation with a negative electrode 45, while unit 52ª has a prepared plate 1ᵈ as aforesaid in operative relation with a negative electrode 45ᵈ.

Figure 29:
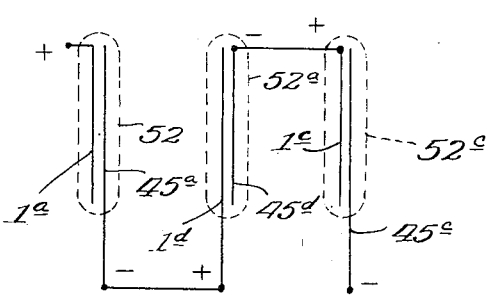
Fig. 29 is a diagram showing a further series connection for such condenser windings to operate on higher voltages.

In Fig. 29, three series connected units 52, 52ª and 52ᶜ are used, in which unit 52 has elements 1ª, 45ª, unit 52ª has elements 1ᵈ, 45ᵈ and unit 52ᶜ has elements 1ᶜ, 45ᶜ as aforesaid.

Figure 30:
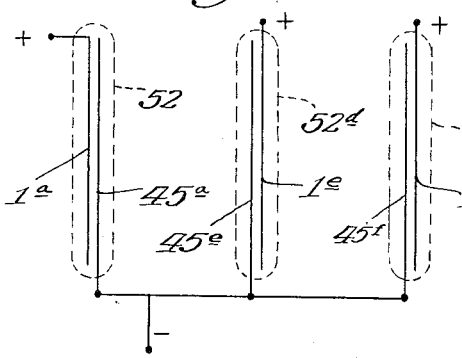
Fig. 30 is a diagram of parallel connected condenser windings, such as shown in Fig. 25.
Figure 27:
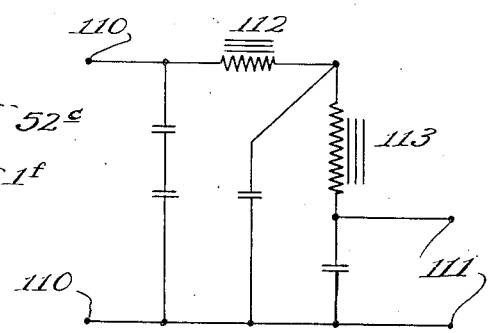
Fig. 27 is a circuit equivalent to that of Fig. 26 shown in conventional manner for comparison to the diagram of Fig. 26.

In Fig. 30 parallel connections for three units 52, 52ᵈ, 52ᵉ are shown, in which unit 52 has elements 1ª, 45ª, unit 52ᵈ has elements 45ᵉ and 1ᵉ, and unit 52ᵉ has elements 1ᶠ and 45ᶠ as aforesaid.

Having now fully set forth my invention and the mode of making and using same in a complete exemplification;

I claim:

1. In the electrical condenser art, a condenser composed of a common negative electrode and a plurality of separated filmed electrodes and impregnated fibrous sheets separating said negative electrode from said filmed electrodes, characterized by the fact that said negative electrode overlaps each of said filmed electrodes.

2. In the electrical condenser art, an operating electrolyte for an electrolytically prepared condenser consisting of a mixture of approximately ten pounds of gum arabic, and forty pounds of glycerine.

3. An electrolytic condenser comprising a roll having convolute layers of anode foil and cathode foil, a dielectric film upon the anode foil in contact therewith, the foil at the exterior of the roll having an outer turn completely encircling the roll, the outer end of said outer foil protruding beyond the end of the other foil, and directly overlying and engaging the underlying area of said outer foil.

4. An electric condenser comprising a roll having convolute layers of anode foil and cathode foil, a dielectric film upon the anode foil in contact therewith, the cathode foil being at the exterior of the roll and having an outer turn completely encircling the roll the outer end of said cathode foil protruding beyond the end of the anode and directly overlying and engaging the underlying cathode area.

5. An electrolytic condenser comprising an active capacity producing unit, including electrode foils with intervening porous means interleaved therebetween and in contact therewith and having film-forming electrolyte retained therein, a wrapper completely enclosing said active unit, said active unit having terminal leads protruding from said wrapper, a casing enclosing said wrapped unit, and means rigidly retaining said unit in fixed position within said casing.

6. An electrolytic condenser comprising an active capacity producing unit, including electrode foils, interleaved porous means in contact at its opposite faces with the respective foils and having film-forming electrolyte retained therein, a leak-tight wrapper completely enclosing said unit, terminal leads protruding through said wrapper, a casing enclosing said enwrapped unit, and a watertight filler occupying the gaps between the walls of said casing and said enwrapped unit.

7. An electrolytic condenser comprising an active capacity producing unit including enrolled metal foil electrodes with intervening absorbent material having electrolyte retained therein, an insulating wrapper about said roll, tabs integral with the respective electrode foils, terminals electrically and mechanically bonded to said tabs, pitch completely embedding the bond between said tabs and said terminals, and an outer casing enclosing said entire unit with the terminals accessible through said casing.

8. A plurality of electrolytic condensers of the roll type arranged in a single unit comprising a common coiled cathode, a plurality of coacting filmed anodes coiled with said common cathode to co-operate therewith and spaced from each other, an absorbent separator arranged between said common cathode and said anodes, and an electrolyte carried by said absorbent separator.

9. The process of making an electrolytic condenser comprising winding two metal electrodes at least one of which is filmed with thin interleaving porous spacers, impregnating said spacers with a homogeneous glycerine gum syrup electrolyte which has been subjected to a temperature of at least 140° C. for at least thirty minutes, enclosing the condenser body thus formed in a moisture-proof container, and sealing the same against the entrance of moisture.

10. The process of making an electrolytic condenser having a plurality of metal electrodes at least one of which is filmed, and interleaved porous spacers, which comprises heating a liquid electrolyte containing gum arabic and polyhydroxy alcohol for at least thirty minutes at a temperature of 140° C. to 150° C. to reduce the electrolyte to a semi-gumming mass devoid of moisture, impregnating the spacers with the hot electrolyte and allowing the spacers to cool, then winding the electrodes with the impregnated spacers interleaved therewith and sealing the condenser in a moisture-proof container.

11. An electrolytic condenser comprising two metal electrodes at least one of which is filmed, thin porous spacers wound therewith, a stable electrolyte containing gum arabic and polyhydroxy alcohol devoid of moisture and held in and on said spacers and in contact with said electrodes, and means for enclosing and sealing the same to exclude moisture.

12. An electrolytic condenser comprising a plurality of metal electrodes separated by interleaving absorbent material impregnated with a homogeneous syrup electrolyte devoid of moisture and consisting of a cooked mixture of gum arabic and glycerine.

13. The process of making an electrolytic condenser having a plurality of metal electrodes one of which at least is filmed, and interleaved spacers, comprising impregnating the spacers with a hot homogeneous glycerine gum syrup electrolyte which has been heated for at least thirty minutes at a temperature of at least 140° C., assembling the electrodes and interleaved spacers, and applying a potential to the condenser for at least five minutes to cause the electrolyte in the spacers to be electrolyzed into operative condition on the electrodes.

14. An electrolytic condenser comprising two metal electrodes at least one of which is filmed, thin porous spacers interleaved with said electrodes, an electrolyte composed of gum arabic and glycerine from which all moisture has been excluded held in and on said spacers and in contact with said electrodes, and means including a moistureproof fibrous wrapper for enclosing and sealing the same to exclude moisture.

PHILIP E. EDELMAN.